US011634866B2

(12) United States Patent
Karvinen (10) Patent No.: US 11,634,866 B2
(45) Date of Patent: Apr. 25, 2023

(54) APPARATUS FOR MEASURING THE DEWATERING OF A PAPER MACHINE AT DIFFERENT POINTS OF THE WET END AND A METHOD FOR IMPLEMENTING IT (71) Applicant: RUNTECH SYSTEMS OY, Kolho (FI)

(72) Inventor: Juha Karvinen, Siltakylae (FI)

(73) Assignee: Runtech Systems OY, Kolho (FI)

( * ) Notice: Subject to any disclaimer, the term of this patent is extended or adjusted under 35 U.S.C. 154(b) by 243 days.

(21) Appl. No.: 16/483,001

(22) PCT Filed: Jan. 25, 2018

(86) PCT No.: PCT/FI2018/050059
§ 371 (c)(1),
(2) Date: Aug. 1, 2019

(87) PCT Pub. No.: WO2018/142024
PCT Pub. Date: Aug. 9, 2018

(65) Prior Publication Data
US 2019/0352852 A1 Nov. 21, 2019

(30) Foreign Application Priority Data

Feb. 2, 2017 (FI) .................................... 20175093

(51) Int. Cl.
*D21G 9/00* (2006.01)
*B01D 19/00* (2006.01)
(Continued)

(52) U.S. Cl.
CPC ....... *D21G 9/0027* (2013.01); *B01D 19/0042* (2013.01); *D21F 1/48* (2013.01);
(Continued)

(58) Field of Classification Search
CPC .............. D21G 9/0027; D21G 9/0009; B01D 19/0042; B01D 19/0036; B01D 19/00;
(Continued)

(56) References Cited

U.S. PATENT DOCUMENTS 5,024,084 A * 6/1991 Frawley, Jr. ............ G01F 1/002
162/198
6,053,039 A * 4/2000 Karvinen ................ G01F 23/14
73/149
2012/0255440 A1* 10/2012 Malm ...................... D21D 5/26
95/262

FOREIGN PATENT DOCUMENTS

DE    102009027798 A1    1/2011
FI        102000 A         9/1996
(Continued)

OTHER PUBLICATIONS

International Preliminary Report on Patentability and Written Opinion for International Patent Application No. PCT/FI2018/050059, dated Aug. 6, 2019 (9 pages).

*Primary Examiner* — Eric Hug
*Assistant Examiner* — Matthew M Eslami
(74) *Attorney, Agent, or Firm* — Kevin E West; Advent, LLP (57) ABSTRACT

An apparatus for measuring dewatering in the wet end of a paper machine includes a measuring receptacle functioning at normal air pressure, in which receptacle the amount of the water of the negatively-pressurized dewatering points of the paper machine is measured by means of a pressure-difference transmitter and of a measuring weir.

18 Claims, 7 Drawing Sheets

(51) Int. Cl.
  *D21F 1/48*   (2006.01)
  *D21F 1/66*   (2006.01)
  *G01F 1/002*  (2022.01)
  *G01F 15/08*  (2006.01)
  *G01F 23/14*  (2006.01)

(52) U.S. Cl.
  CPC ............... *D21F 1/66* (2013.01); *G01F 1/002* (2013.01); *G01F 15/08* (2013.01); *G01F 23/14* (2013.01)

(58) Field of Classification Search
  CPC ..... D21F 1/48; D21F 1/66; D21F 1/52; D21F 7/00; D21F 3/10; G01F 1/002; G01F 15/08; G01F 23/14; G01F 1/34; G01F 1/40; D21D 19/00
  See application file for complete search history.

(56) References Cited

FOREIGN PATENT DOCUMENTS

GB   1247013 A   9/1971
WO   9636851 A1  11/1996

\* cited by examiner

Fig. 1

APPARATUS FOR MEASURING THE DEWATERING OF A PAPER MACHINE AT DIFFERENT POINTS OF THE WET END AND A METHOD FOR IMPLEMENTING IT

CROSS-REFERENCE TO RELATED APPLICATIONS

This is a U.S. national stage entry of International Patent Application No. PCT/FI2018/050059, filed on Jan. 25, 2018, which claims priority to Finnish Patent Application No. 20175093, filed Feb. 2, 2017, the entire contents of all of which are fully incorporated herein by reference.

The object of the invention is an apparatus, as defined in the preamble of claim 1, for measuring the dewatering of a paper machine at different points of the wet end. In the apparatus, water 7 is removed from the web in a suction box 1 with negative pressure and the water 7 removed into the suction box 1 is conducted along a suction leg pipe 18 installed in the apparatus for measuring the dewatering. The invention also relates to a method according to claim 7.

It is generally known in the art that when manufacturing paper, chemical pulp and board, different techniques for removing water from the fiber/water mixture, i.e. from the web, are used at the wet end of the machine. Water is separated from the web by means of centrifugal forces, negative pressure and/or wet pressing. The terms 'paper web' and 'paper machine' used hereinafter refer to all the aforementioned products and productions. It is important to measure the water separated from the web in different parts of the machine in order to optimize production efficiency. It is also worth measuring the water removed from the fabrics used in the press section for optimizing the machine and for fabric development.

DEWATERING OF THE WEB

One typical solution according to the state of the art, which is disclosed in specification U.S. Pat. No. 6,053,039A, is presented in FIG. 1; the operating principle of a dewatering means, i.e. a suction box 1, removing water with negative pressure. In this solution, air is sucked through the wet web or press fabric. The water is removed into the box because of volumetric compression of the web/fabric and because of the air flow. The figure also presents a water separator 2, which separates the water 7 and air 10 flowing from the suction box 1. From the separator 2 the water 7 flows along a suction leg pipe 3, which is also generally referred to in its shortened form 'suction leg' 3, by means of gravity into a two-part container 11. The first part of the container, on the suction leg 3 side, is called a water seal section 4, and the second part is called a pumping section 5.

Figure 1:
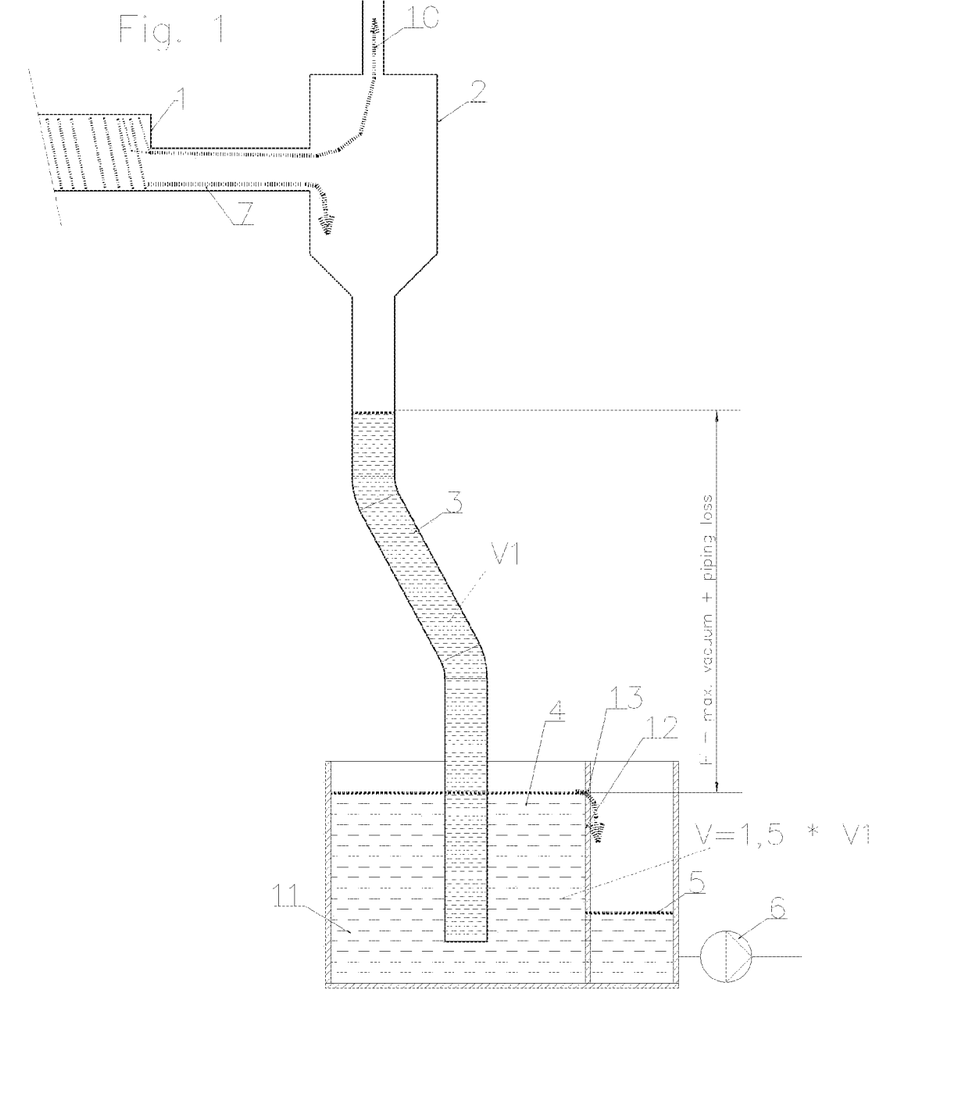
FIG. 1 presents the operating principle of a solution according to what is known in the art.

The volume of the water seal section 4 must be at least 1.5 times the water volume drawn into the suction leg pipe 3 by negative pressure. The height of the suction leg 3 must be at least the maximum height H of the water column lifted into the pipe by the negative pressure. The water 7 flows from the water seal section 4 via an overflow weir 12 into the pumping section 5, from where the water is returned back to the process by pump 6. Instead of a suction leg pipe 3, a pump can be used for removing water from the water separator 2.

MEASUREMENT OF DEWATERING

Currently, magnetic flow meters are used to measure the flow rate of the water removed with the water drainage technique presented above. One problem, however, is that the drainage waters of a paper machine contain a lot of air. For this reason, with liquids containing air all the devices measuring the flow velocity of the liquid give a false result, as also does a magnetic flow meter, because the air content increases the flow velocity. Therefore, a second technique is used, i.e. weir flow measurement, that functions better with liquids containing air. Conventional weir flow measurement uses a V-orifice weir, the height of the surface formed by the weir being measured either with a pressure transmitter or with a surface height meter. In all measurements functioning on the weir principle, it is important that the flow velocity before the weir is controlled. In V-orifice measurements, a relatively long and straight pipe is needed before the measurement. A problem with a V-weir in a paper machine is the space requirement and the solids in the flows that easily lodge in the sharp bottom corner of the weir.

Another solution known from specifications U.S. Pat. No. 5,875,675 and US6053 is the weir plate 8 according to FIG. 2, the weir plate being replaceable depending on the flow rate and having an A-shaped 9 weir orifice in it. This type of solution allows solids to pass through because the bottom part of the weir is broad. The high top part, in turn, facilitates the measurement of surface height because the weir height is much higher than with a V-weir. The aforementioned specifications describe a weir measurement wherein water falls into a measuring receptacle from above. In specification U.S. Pat. No. 5,875,675, flow velocity with a weir orifice is controlled by conducting flows coming from different directions to meet, in which case the flow velocity is nullified, or according to specification U.S. Pat. No. 6,053,039, by conducting the water via an orifice, i.e. a water seal, below the weir for measurement.

DRAWBACKS AND PROBLEMS OF PRIOR ART

The measuring principles described above are widely used nowadays in the paper industry. However, they have some problems: firstly; conducting water from above downwards for measuring requires a lot of space in the height direction. In the negatively-pressurized system according to FIG. 1, the meter must be installed below the separator 2.

An essential drawback is that in a solution according to the state of the art, in which the meter is connected to the water separator 2, measurement of the dewatering does not function if the water in the suction leg 3 rises into the meter. For this reason, the aforementioned problem is solved with a separate pump and meter in each location. This results in high piping costs and, particularly with a new paper machine, separate measurements raise investment costs.

The solution according to the invention is characterized by what is disclosed in the claims.

BRIEF DESCRIPTION OF THE INVENTION

In the following a new measuring system for measuring the drainage waters of a paper machine will be disclosed, which system resolves the problems known in the art and presented above.

According to the invention, a solution has been achieved wherein a new type of apparatus with which a method for measuring dewatering at the wet end of a paper machine can be utilized more efficiently. The solution is suited for measuring dewatering both in dewatering points subject to atmospheric pressure and in dewatering points subject to negative pressure. All the measurements of the drainage waters of a paper machine can be implemented with one measuring receptacle containing also the necessary water seal containers and the separate solutions needed for exhaust pumping.

In the following, the invention will be described in more detail with reference to the attached drawings, wherein.

According to the state of the art, the container of the water seal compartment 4 needed by the suction legs 3 is typically implemented according to FIG. 1. The drainage water 7 is guided from the suction box 1 along the suction leg 3 into the water seal section 4 of a two-part container 11. According to the state of the art, the container 11 is cylindrical in shape, a separate overflow weir 12 being formed in the cylinder, the weir functioning as a dividing wall between the water seal section 4 and the pumping section 5. A rise 13 in the water level is brought about by the overflow weir 12 for forming a water seal section 4. The water 7 flows from the water seal section 4 over the overflow weir 12 into the pumping section 5; the solution requires a lot of floor space. Another essential drawback is that the measurements of the drainage waters 7 are implemented separately for each point, i.e. with a separate meter under a separate water separator 2. That being the case, each meter is its own separate unit, which raises costs.

Figure 3:
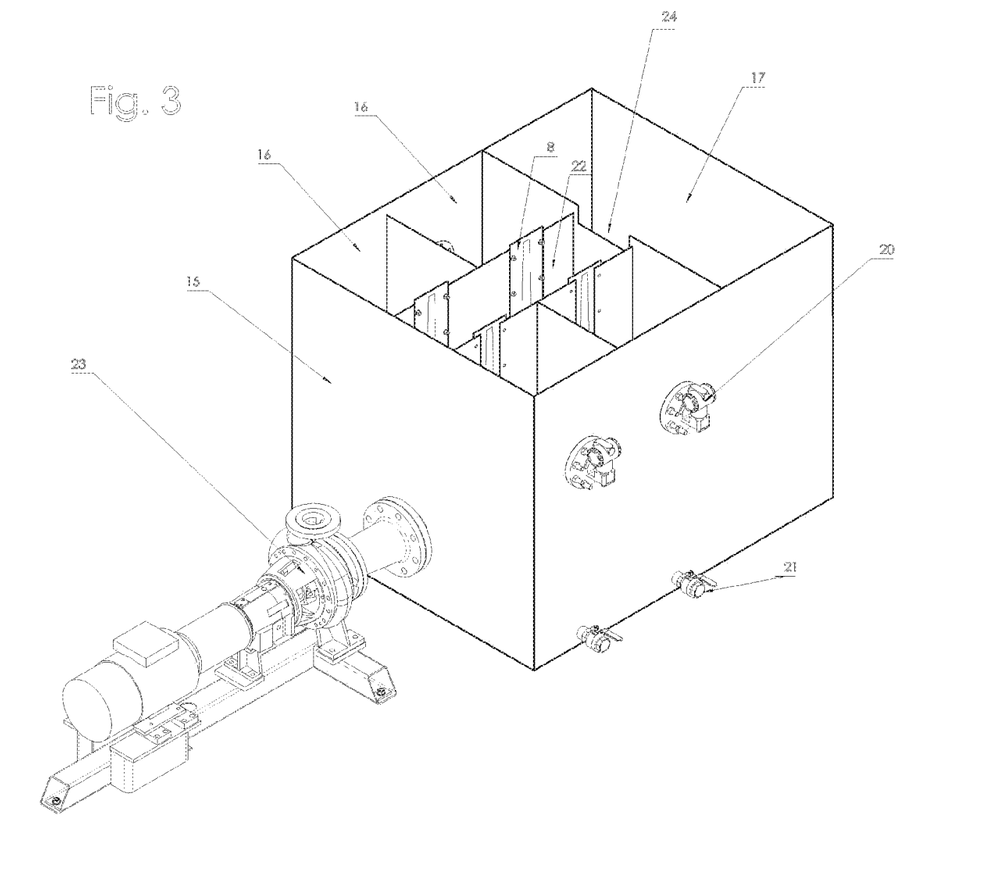
FIGS. 3-5 present a preferred structural embodiment of a solution according to the invention as an oblique side view, from above, and directly from the side.
Figure 4:
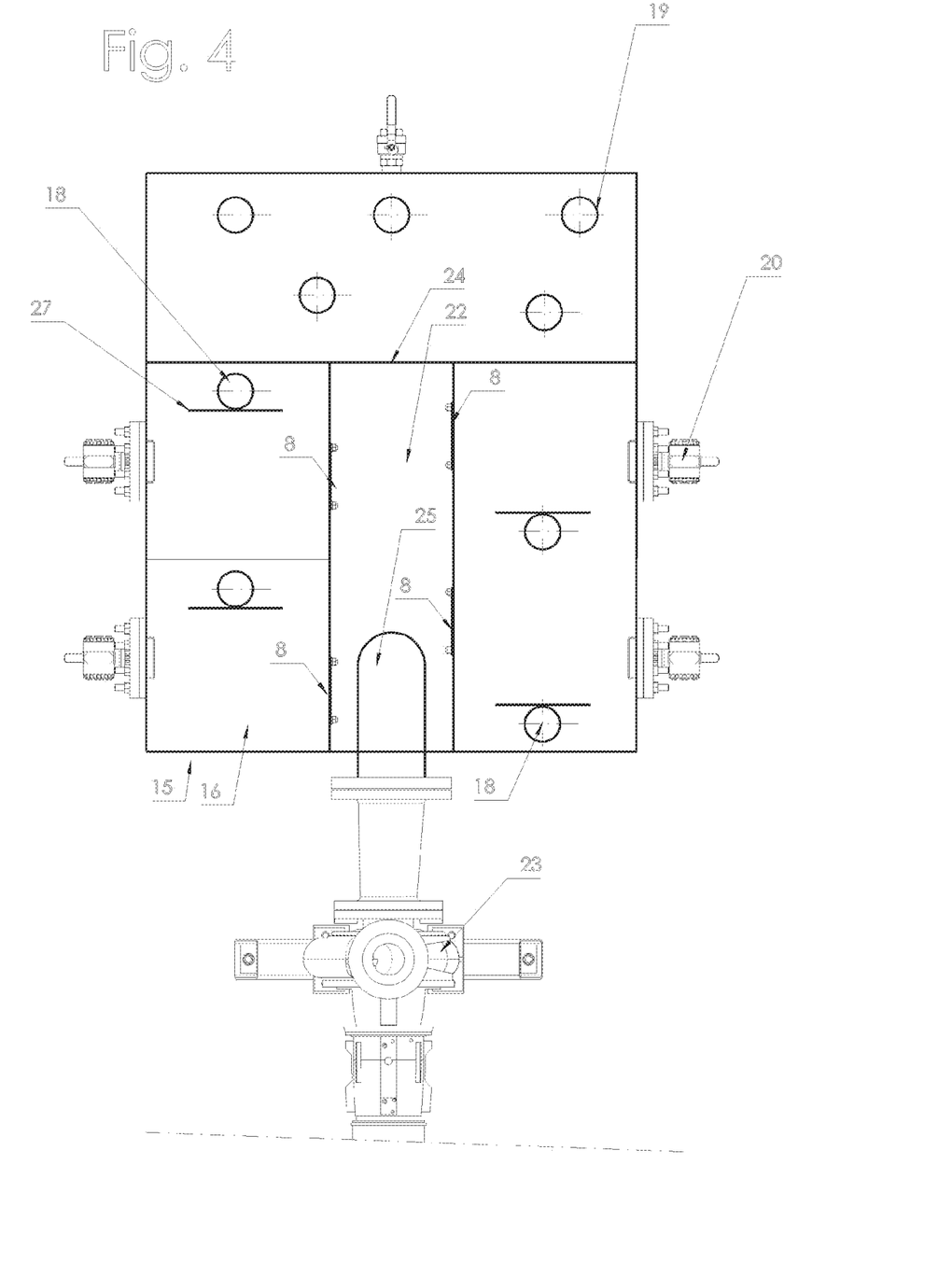
Figure 5:
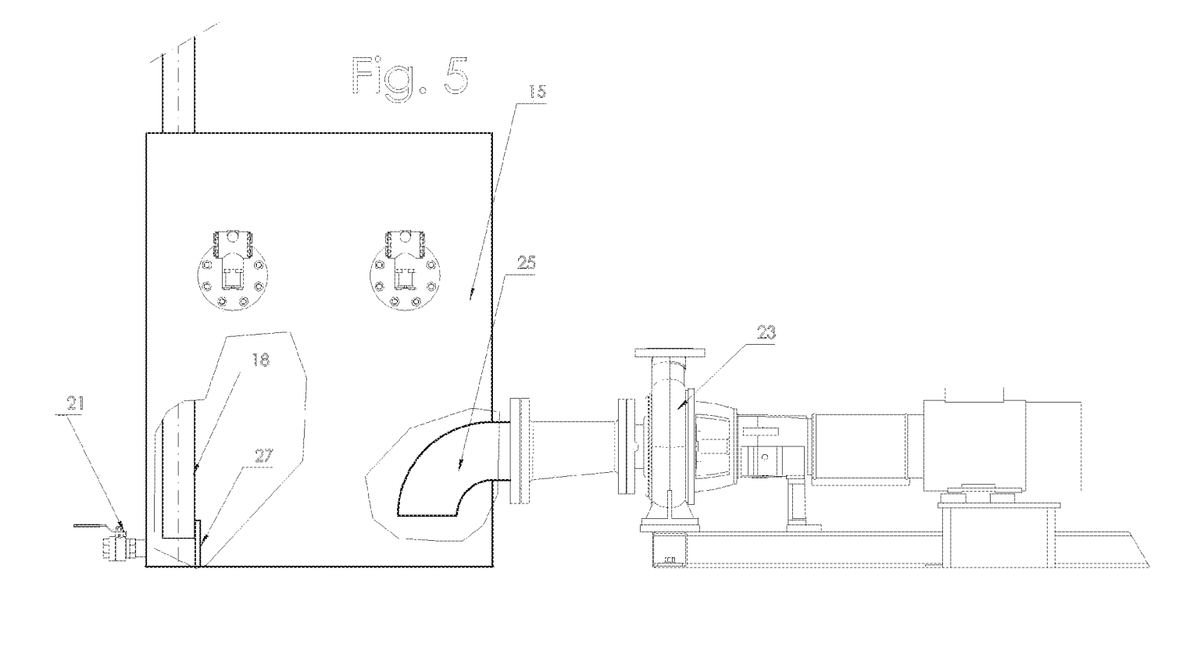
Figure 7:
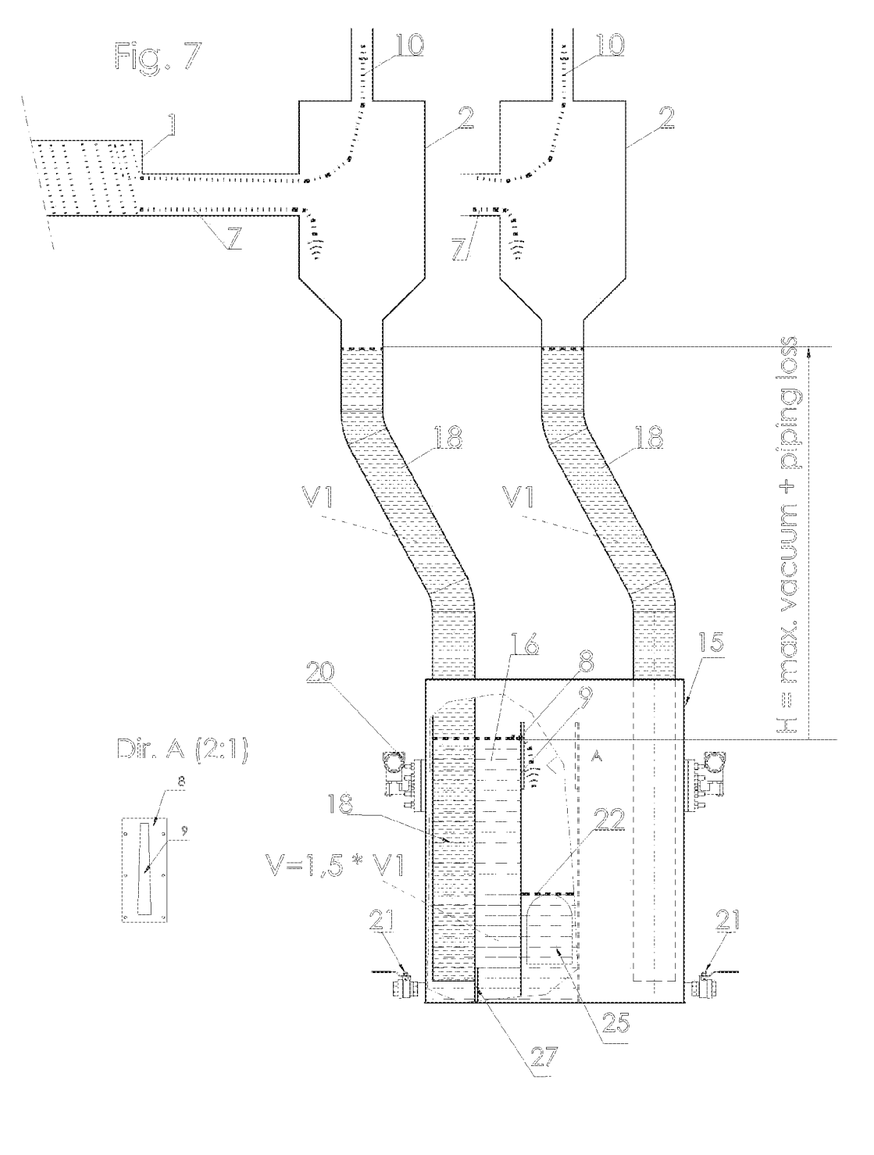
FIG. 7 presents a direct side view of a preferred operating principle of the solution according to the invention as viewed when partially sectioned.

FIGS. 3-5 present a structural solution according to the invention and the apparatus needed for said solution. FIG. 7 discloses a methodical representation according to the invention, which presents by way of illustration two flow measurements from two different negatively-pressurized dewatering points in one measuring receptacle. In the invention, the conventional principle presented in FIG. 1 is applied in a new way for measuring the drainage waters 7 of negatively-pressurized dewatering points. What is essential in the invention is that, with the new system, measuring of the drainage waters 7 of all the necessary dewatering points can be implemented with just one measuring receptacle 15. Measuring the waters 7 removed from dewatering points refers primarily to the water flow that is sucked by means of negative pressure in different parts of a paper machine, or the amount of water that splashes from the surface of the rolls into troughs.

The meter according to the invention means a common measuring receptacle 15, into which all the drainage water pipes can be directed, including those pipes of which the water is not measured. Particularly essential is that negative pressure acts only in the inlet pipe, i.e. in the suction leg 18, directed into the water seal compartment 16 of the measuring receptacle 15 functioning as a meter. The structure of the suction leg 18 corresponds to a state-of-the-art suction leg 3, but the operating principle of the suction leg 18 in the measuring receptacle 15 differs essentially from a state-of-the-art solution. What is also essential is that measurement of the water 7 itself is performed at normal air pressure at the measuring weir 8 of the measuring receptacle 15. The amount of the waters removed from dewatering points that are at normal air pressure can also be measured in the measuring receptacle. The measuring receptacle 15 and the water seal compartments 16 formed in it, the measuring weirs 8 and the pumping compartment 22 are most preferably disposed at basement level, i.e. below the machine level of the apparatus.

In the solution according to the invention, the amount of water 7 to be measured is directed along a suction leg pipe 18 into the water seal compartment 16 of a measuring receptacle 15 functioning as a meter, in which compartment the water 7 arriving from above discharges to below the water surface. What is essential is that negative pressure acts only in the suction leg 18 functioning as an inlet pipe; in the measuring receptacle 15 itself normal air pressure prevails. The measuring receptacle 15 is most preferably a rectangularly shaped container the height of which is the width or height of a standard steel plate, e.g. 1250 or 1500 mm. The necessary number of water seal compartments 16, are arranged in the measuring receptacle 15, typically 3-10 water seal compartments 16. Each suction leg 18 has its own water seal compartment 16, the water 7 flow of which compartment it is desired to measure. The volume of one water seal compartment 16 is at least 1.5* the volume of the water rising into the suction leg 18.

For separating the air 10 arriving with the water flow from the water 7, a deaeration plate 27 is installed in front of the suction leg 18 in the meter 15, more particularly in such a way that that it is on the side of the measuring weir 8. In other words, the deaeration plate 27 is installed between the suction leg 18 entering the compartment 16 and the measuring weir 8. In this way the deaeration plate 27 forces the water flow, as well as the air 10 arriving along with the water, upwards along the deaeration plate 27 and the container wall of the measuring receptacle 15. The air 10 is guided to the surface from the water flow as far away as possible from the measuring weir 8, most preferably immediately after the suction leg 18, in which case the water flowing through the measuring weir 8 is disturbance-free. The width of the deaeration plate 27 is at least 2.5* the diameter of the suction leg pipe 18, the plate 27 if necessary acting simultaneously as a support of the suction leg pipe 18. What is essential is that the deaeration plate 27 is situated as far away as possible from the measuring weir 8, so that the rising air 10 does not disturb the flow and the water measurement at the measuring weir 8.

Figure 2:
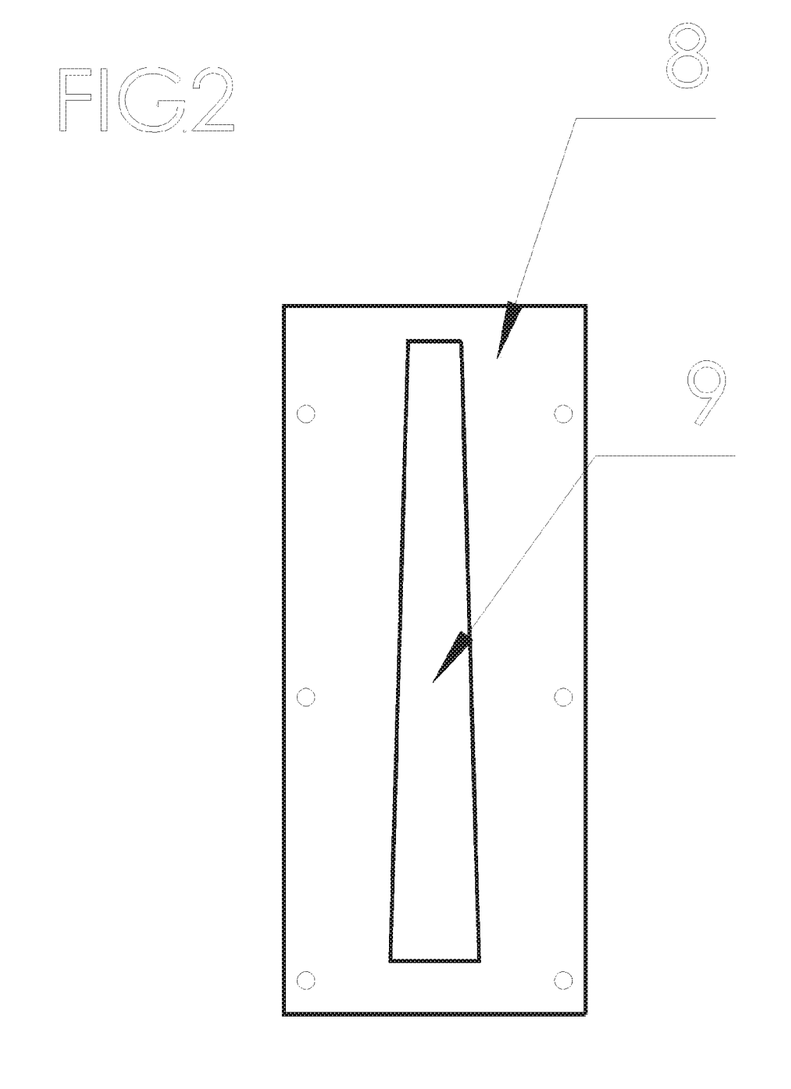
FIG. 2 presents a typical A-shaped weir orifice of a measuring weir.

The water flow is measured most preferably with an A-shaped 9 measuring weir 8 according to FIG. 2 and the water level is measured with a pressure-difference transmitter 20. FIG. 7 shows the position of the measuring weir 8 with respect to the pressure-difference transmitter 20, and how the water 7 discharges via the measuring weir 8 from the water seal compartment 16 into the pumping compartment 22. When examined more closely, the position of the measuring weir 8 from the direction A of FIG. 7 with respect to the pressure-difference transmitter 20 is on the opposite side of the water seal compartment 16, and the measuring weir 8 is installed on one wall of the water seal compartment 16 on the top part of said wall. In this way the water 7 discharges from the measuring weir 8 installed on one wall of the water seal compartment 16 functioning as a measuring compartment into the pumping compartment 22. The measuring weirs 8 are installed according to FIGS. 3-5 on opposite sides of the pumping compartment 22 in such a way that the water discharges from the measuring weir 8 of the compartment 16 into the pumping compartment 22, towards the fixed wall of the other compartment 16 on the opposite side to it. In this way the water jet discharging from a measuring weir 8 installed in a non-direct line does not collide with the water jet of a measuring weir 8 coming from the opposite side, but instead is funneled past, thus avoiding the measuring error that would be produced with colliding jets.

The pressure-difference transmitter 20 measures the height of the water level produced by the measuring weir 8. A pressure-difference transmitter 20 that is provided with e.g. a 50 mm membrane is used in the solution. What is essential is that the membrane of the transmitter does not clog with dirt, such as e.g. a thin pressure transmission pipe according to what is known in the art. In addition, the pressure-difference transmitter 20 is situated in such a way that the center line of the membrane is level with the bottom surface of the weir 8. The size of the meter depends on the flow rates; for example, the height*width*depth of the meter for a maximum flow of 1000 l/min are 0.6*0.7*0.5 m.

There is one suction leg 18 per each water seal compartment 16, from which suction leg the drainage water 7 discharges through the measuring weir 8 into the pumping compartment 22. In other words, the water seal compartment 16 functioning as a measuring compartment and the suction leg 18 installed in it, together with the deaeration plate 27 and the pressure-difference transmitter 20 and also the measuring weir 28, form a single unit for measuring a dewatering point. These types of units are installed in the measuring receptacle 15, depending on how many drainage waters 7 of the dewatering point it is desired to measure. Generally, there are 3-10 points having separate suction legs 18 and the drainage water 7 of which points it is desired to measure. In each compartment 16 there is also a separate discharge valve 21, via which the excess material detrimental to the measuring, such as paperpulp that has drifted into the measuring receptacle, can be removed during servicing. The measuring receptacle 15 has one pumping compartment 22, which functions as a common pumping section for directing the drainage water back into the process.

In addition to this, the paper machine also has suction legs 19 in which process water does not flow or which water is not measured for some reason. These suction legs 19 are disposed in a common water seal compartment 17 of the container functioning as a measuring receptacle 15. Most preferably the common water seal compartment 17 is situated at one end of the container. The water from this common compartment 17 is guided via an overflow 24 into the pumping compartment 22 in the center of the container, the compartment 22 in this way functioning as a common pumping section. From the pumping compartment 22 that is in the center of the container and that acts as a measuring receptacle 15, the water is pumped back into the process with a pump 23. The suction pipe 25 of the pump is oriented in the pumping compartment 22 downwards in a curve, thus ensuring that air does not gain access to the pump 23.

According to what is presented above, measurement of the drainage waters 7 of all the necessary dewatering points is implemented with just one measuring receptacle 15 with the solution according to the invention. The combined system according to the invention is considerably cheaper in comparison to the state of the art, which has separate water seal containers and water measurement. Significant advantages are achieved with the compact solution according to the invention presented, particularly as with techniques known in the art the meter must often, due to lack of space, be installed far away, even in a cellar lower than the machine level. In such a case the piping costs increase and the high flow velocity caused by water falling long distances downwards distorts measurement results. Another problem that distorts measurement results is the high air content brought along with water falling from above as well as the noise caused by the water for measurement.

EMBODIMENT

Figure 6:
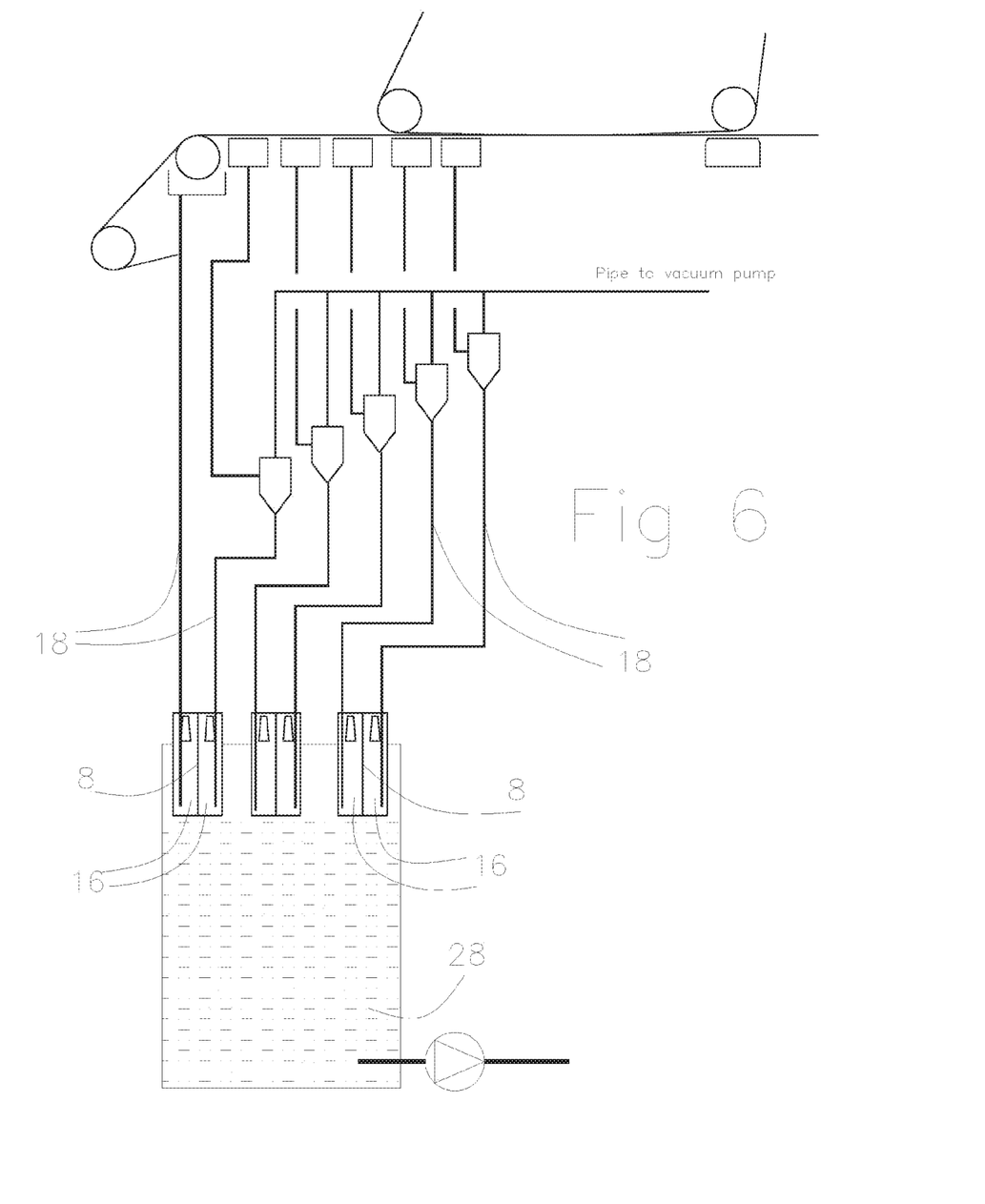
FIG. 6 presents a preferred embodiment of the solution according to the invention.

FIG. 6 presents one preferred measuring embodiment for measuring dewatering. What is essential in this embodiment is that the new solution according to the invention is utilized in a finished paper machine that is already in a paper mill. That being the case, the embodiment has as its basis a solution that is per se conventional, which solution is modified with the system according to the invention. The suction leg 3 of FIG. 1, which in this embodiment corresponds to the suction leg 18 of FIG. 7, is led into water seal compartments 16 according to the invention.

In the embodiment, also, the separate overflow weir, according to FIG. 1, separating the water seal section 4 and the pumping section 5 has been removed. In this way, the round container in the paper machine, which container is presented in FIG. 6 as the container 28, is utilized in the embodiment. This container 28 functions as a pumping compartment 22 according to FIGS. 3-5. The water seal compartments 16 according to the invention are installed in the top part of the round container 28 in the paper machine. In the embodiment, the water seal compartments 16 are duplicated, i.e. there are two separate water seal compartments 16 in one container that functions as a meter. From the water seal compartment 16 the water is guided to a measuring weir 8 according to FIGS. 3-5, in front of which weir is installed a deaeration plate 27 that forces the water flow and the air arriving with it upwards along the wall of the container. The water 7 discharging from the measuring weir 8 falls into the container 28 functioning as a pumping compartment in the paper machine, from which container it is conducted away, most preferably back into the process.

According to what is presented above, the water seal compartments 16 function in a manner fully corresponding to that in the solution of FIGS. 3-5 for measuring dewatering. The measuring principle is the same as in FIG. 7, which presents flow measurement from a dewatering point under negative pressure as well as a method implemented with it for measuring dewatering 7. A number of these types of meters 15, typically 1-5 units depending on the number of measuring points, are installed in the top part of the container 28, which meters can have two water seal compartments 16. In this way the container 28 functions as a pumping compartment common to all the meters.

It is obvious to the person skilled in the art that the invention is not limited to the embodiments presented above, but that it can be varied within the scope of the claims presented below. Essential to the invention is that it comprises:

a measuring receptacle 15 functioning as a meter under normal air pressure, in which meter the waters 7 of the dewatering points of the paper machine that are subject to negative pressure are measured,     a suction leg pipe 18 acting under negative pressure, which leads from the dewatering point into the measuring receptacle 15 from above into the water seal compartment 16,     a deaeration plate 27 installed before the suction leg pipe 18, for separating the air 10 arriving with the water 7,     a weir plate installed between the water seal compartment 16 and the pumping compartment 22, the weir plate functioning as a measuring weir 8 for measuring the amount of the dewatering flow, and a pressure-difference transmitter 20 installed on one side, which transmitter measures the height of the water surface produced by the measuring weir 8 for measuring the amount of water 7.

The solution according to the invention is less expensive to manufacture than the solution according to FIG. 1 describing the state of the art, and also the measurement result is better.

The invention claimed is:

1. An apparatus for measuring the dewatering of a paper machine at different dewatering points of a wet end of the machine, the apparatus comprising:
a measuring receptacle functional as a meter under normal air pressure, in which meter water of the dewatering points subject to negative pressure is measured;
a plurality of suction leg pipes operable under negative pressure and directing the water from a respective dewatering point into a plurality of water seal compartments disposed in the measuring receptacle;
a plurality of weir plates, each weir plate installed between a respective one of the plurality of water seal compartments and a pumping compartment, each weir plate functional as a measuring weir for measuring the amount of dewatering flow;
a plurality of pressure-difference transmitters, each pressure-difference transmitter installed on a respective one of the plurality of water seal compartments and configured to measure the height of the water surface produced by a corresponding measuring weir for measuring the amount of water; and
a plurality of deaeration plates, each deaeration plate installed between a suction leg pipe of the plurality of suction leg pipes and a corresponding measuring weir;
wherein water discharges from the measuring weir installed on one wall of the water seal compartment into the pumping compartment, and in that the different measuring weirs of the meter are installed on opposite sides of the pumping compartment wherein the water discharges from the measuring weir of the compartment into the pumping compartment towards the fixed wall of the water seal compartment of the other meter on the opposite side to it.

2. The apparatus according to claim 1, wherein each of the plurality of suction leg pipes is associated with its own water seal compartment, deaeration plate, measuring weir, and pressure-difference transmitter forming the meter in the measuring receptacle for measuring dewatering.

3. The apparatus according to claim 2, wherein there are at least two units of meters in the measuring receptacle.

4. The apparatus according to claim 2, wherein the pumping compartment is either integrated into the measuring receptacle or installed to be a separate pumping compartment external to the measuring receptacle.

5. The apparatus according to claim 2, wherein the weir plate is A-shaped and the pressure-difference transmitter is provided with a membrane wherein a center line of the membrane is level with a bottom surface of the measuring weir.

6. A method for measuring the dewatering of a paper machine at different dewatering points of a wet end of the machine, wherein water is removed by negative pressure in a suction box and the water removed into the suction box is conducted along a plurality of suction leg pipes, the method comprising:

measuring water of the dewatering points of the paper machine subject to negative pressure in a measuring receptacle functioning as a meter at normal air pressure;
guiding water from a dewatering point by gravity along respective ones of a plurality of negatively-pressurized suction leg pipes into the measuring receptacle and discharging into a plurality of water seal compartments below the water surface; and
separating air from the water via a deaeration plate, the plate forcing air arriving with the water upwards to the surface along the deaeration plate and a container wall of the measuring receptacle,
wherein in the method, the measuring is performed by a weir plate installed between each of the plurality of water seal compartments and a pumping compartment, the weir plate functioning as a measuring weir for measuring dewatering flow, and a pressure-difference transmitter that measures the height of the water surface produced by the measuring weir for measuring the amount of water, and
wherein the water discharges from the measuring weir installed on one wall of the water seal compartment into the pumping compartment, and different measuring weirs of the meter are installed on opposite sides of the pumping compartment wherein the water discharges from the measuring weir of the respective water seal compartment into the pumping compartment towards a fixed wall of the water seal compartment of another meter on the opposite side to it.

7. The method according to claim 6, wherein in the method the amount of water of each separate dewatering point is measured wherein the water is guided along a respective one of the plurality of suction leg pipes into the water seal compartment, air in the water is separated by the deaeration plate, and the amount of water is measured by the measuring weir and the pressure difference transmitter, forming the meter in the measuring receptacle for measuring dewatering.

8. The method according to claim 6, wherein there are at least two units of meters in the measuring receptacle.

9. The method according to claim 6, wherein in the method the weir plate is A-shaped and the pressure-difference transmitter is provided with a membrane wherein a center line of the membrane is level with a bottom surface of the measuring weir.

10. An apparatus for measuring the dewatering of a paper machine comprising:
a measuring receptacle open to ambient air pressure, the measuring receptacle for receiving water from a plurality of dewatering points of the paper machine, the measuring receptacle including a plurality of water seal compartments and a pumping compartment; and
a plurality of suction leg pipes under negative pressure, each of the plurality of suction leg pipes directing the water from a respective one of the plurality of dewatering points into a respective one of the plurality of water seal compartments so that the water is discharged below a water surface of the water seal compartment,
wherein each water seal compartment includes a measuring weir disposed between the water seal compartment and the pumping compartment for measuring water flow flowing from the water seal compartment into the pumping compartment and a differential pressure transmitter for measuring the water level of the water seal compartment, wherein the measured water flow and water level permit the amount of water discharged from each of the plurality of dewatering points into the water seal compartment to be determined independently.

11. The apparatus according to claim 10, wherein each water seal compartment further includes a deaeration plate, the deaeration plate configured to separate air from the water flowing from the respective suction leg pipe into the water seal compartment.

12. The apparatus according to claim 11, wherein the deaeration plate is disposed immediately adjacent to the respective suction leg pipe.

13. The apparatus according to claim 12, wherein the deaeration plate is configured to support the respective suction leg pipe.

14. The apparatus according to claim 11, wherein the differential pressure transmitter is disposed on an opposite wall of the water seal compartment from the measuring weir.

15. The apparatus according to claim 14, wherein the weir plate is A-shaped and the differential pressure transmitter is provided with a membrane, and wherein a center line of the membrane is level with a bottom surface of the measuring weir.

16. The apparatus according to claim 10, wherein the measuring receptacle further includes a common water seal compartment, the common water seal compartment configured to receive a plurality of suction legs directing water into the common water seal compartment.

17. The apparatus according to claim 16, further including an overflow disposed between the common water seal compartment and the pumping compartment.

18. The apparatus according to claim 10, wherein the water in the pumping compartment is configured to be pumped from the pumping compartment back into the paper machine.

* * * * *